US010330331B2

(12) United States Patent
Yin et al.

(10) Patent No.: US 10,330,331 B2
(45) Date of Patent: Jun. 25, 2019

(54) INDEPENDENT TEMPERATURE AND HUMIDITY PROCESSING AIR CONDITIONING SYSTEM DRIVEN BY LOW-LEVEL THERMAL ENERGY

(71) Applicant: SOUTHEAST UNIVERSITY, Jiangsu (CN)

(72) Inventors: Yonggao Yin, Jiangsu (CN); Yaming Dong, Jiangsu (CN); Xiaosong Zhang, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 49 days.

(21) Appl. No.: 15/534,354

(22) PCT Filed: May 25, 2016

(86) PCT No.: PCT/CN2016/083316
§ 371 (c)(1),
(2) Date: Jun. 8, 2017

(87) PCT Pub. No.: WO2017/088400
PCT Pub. Date: Jun. 1, 2017

(65) Prior Publication Data
US 2018/0259203 A1 Sep. 13, 2018

(30) Foreign Application Priority Data

Nov. 24, 2015 (CN) .......................... 2015 1 0820755

(51) Int. Cl.
*F24F 3/147* (2006.01)
*F24F 5/00* (2006.01)
(Continued)

(52) U.S. Cl.
CPC ............ *F24F 3/147* (2013.01); *F24F 5/0014* (2013.01); *F25B 15/06* (2013.01); *F25B 17/02* (2013.01);
(Continued)

(58) Field of Classification Search
CPC ........ F24F 3/147; F24F 3/1429; F24F 5/0014; F25B 30/06; F25B 17/00; F25B 17/02;
(Continued)

(56) References Cited

U.S. PATENT DOCUMENTS 2,235,071 A * 3/1941 Gonzalez .................. F25B 1/10
62/117
2,826,049 A * 3/1958 Gilmore .................. F25B 15/00
165/118
(Continued)

FOREIGN PATENT DOCUMENTS

CN 103017269 A 4/2013
CN 203132011 U 8/2013
(Continued)

*Primary Examiner* — Cassey D Bauer
*Assistant Examiner* — Kirstin U Oswald
(74) *Attorney, Agent, or Firm* — Saliwanchik, Lloyd & Eisenschenk (57) ABSTRACT

An independent temperature and humidity processing air conditioning system driven by low-level thermal energy, comprising an absorption-type refrigeration circulation loop, a solution dehumidification and regeneration circulation loop, a water cooling circulation loop, and a central air conditioning air supply and air return pipeline; the absorption-type refrigeration circulation loop comprises an evaporator (21), an absorber (26), a generator pump (25), a second solution heat exchanger (27), a generator (1), a condenser (2), a water-water heat exchanger (3), and a throttle valve (20); the solution dehumidification and regeneration circulation loop comprises a regenerator (8), a first solution pump (9), a solution heater (10), a first solution heat exchanger (Continued)

(12), a second solution pump (16), a solution cooler (17), and a dehumidifier (18); the water cooling circulation loop comprises two branches; and the central air conditioning air supply and a return pipeline comprises an air supply pipeline (13), an air return pipeline (14), an air conditioning heat exchanger (15), a dehumidifier (18), an evaporator (21), an air supply induction opening (23), an air return induction opening (22), a second flow guide fan (11), and a regenerator (8). The present air-conditioning system can resolve the problem of efficiently driving absorption-type cooling for air conditioning adjustment under 80° C.

4 Claims, 1 Drawing Sheet

(51) Int. Cl.
  *F25B 30/06*     (2006.01)
  *F25B 17/02*     (2006.01)
  *F25B 15/06*     (2006.01)
  *F25B 25/00*     (2006.01)
  *F25B 29/00*     (2006.01)
  *F24F 3/14*      (2006.01)
  *F25B 27/00*     (2006.01)

(52) U.S. Cl.
  CPC .......... *F25B 25/005* (2013.01); *F25B 29/006* (2013.01); *F25B 30/06* (2013.01); *F24F 3/1429* (2013.01); *F25B 27/00* (2013.01); *F25B 2339/047* (2013.01); *Y02A 30/277* (2018.01); *Y02B 30/62* (2013.01)

(58) Field of Classification Search
  CPC ...... F25B 29/006; F25B 15/06; F25B 25/005; F25B 27/00; F25B 2339/047; Y02A 30/277; Y02B 30/62
  USPC ........................................................ 62/259.4
  See application file for complete search history.

(56) References Cited

U.S. PATENT DOCUMENTS

| | | | | |
|---|---|---|---|---|
| 3,403,723 A * | 10/1968 | Meckler | F24F 3/1417 | 165/210 |
| 3,490,517 A * | 1/1970 | Meckler | F24F 3/056 | 165/210 |
| 3,575,008 A * | 4/1971 | Lorenz | F25B 15/06 | 62/103 |
| 3,745,780 A * | 7/1973 | Leonard, Jr. | F04D 1/12 | 62/141 |
| 3,854,301 A * | 12/1974 | Cytryn | F25B 15/00 | 62/101 |
| 3,864,929 A * | 2/1975 | Hopkins | F25B 15/06 | 62/101 |
| 3,864,930 A * | 2/1975 | Hopkins | F25B 15/06 | 62/101 |
| 3,895,499 A * | 7/1975 | Hopkins | F25B 15/06 | 62/101 |
| 3,949,566 A * | 4/1976 | Hopkins | F25B 15/06 | 62/475 |
| 4,009,575 A * | 3/1977 | Hartman, Jr. | F01K 5/02 | 60/648 |
| 4,011,731 A * | 3/1977 | Meckler | F24F 3/1405 | 126/609 |
| 4,033,740 A * | 7/1977 | Meckler | A62C 3/00 | 62/259.4 |
| 4,070,870 A * | 1/1978 | Bahel | F24D 11/003 | 62/235.1 |
| 4,151,721 A * | 5/1979 | Kumm | F24F 5/0046 | 62/79 |
| 4,164,125 A * | 8/1979 | Griffiths | F24F 3/1417 | 62/238.3 |
| 4,171,624 A * | 10/1979 | Meckler | F24F 3/1417 | 62/271 |
| 4,205,529 A * | 6/1980 | Ko | F24F 3/1417 | 62/235.1 |
| 4,222,244 A * | 9/1980 | Meckler | B01D 53/26 | 62/235.1 |
| 4,285,209 A * | 8/1981 | Luthi | F25B 15/06 | 62/238.3 |
| 4,309,877 A * | 1/1982 | Tawse | F02G 5/00 | 62/238.1 |
| 4,373,347 A * | 2/1983 | Howell | B01D 53/263 | 62/112 |
| 4,386,501 A * | 6/1983 | Jaeger | F25B 15/00 | 62/112 |
| 4,475,361 A * | 10/1984 | Alefeld | F25B 15/008 | 62/476 |
| 4,594,856 A * | 6/1986 | Rothmeyer | F25B 17/083 | 62/112 |
| 4,813,242 A * | 3/1989 | Wicks | F25B 15/008 | 62/238.3 |
| 4,819,444 A * | 4/1989 | Meckler | F02G 1/043 | 62/238.6 |
| 4,905,479 A * | 3/1990 | Wilkinson | F24F 3/1417 | 165/103 |
| 4,955,205 A * | 9/1990 | Wilkinson | F24F 3/1417 | 62/176.4 |
| 4,987,748 A * | 1/1991 | Meckler | F02G 1/043 | 62/176.1 |
| 4,987,750 A * | 1/1991 | Meckler | F02G 1/043 | 62/238.6 |
| 5,027,616 A * | 7/1991 | Tongu | F25B 15/02 | 62/476 |
| 5,070,703 A * | 12/1991 | Wilkinson | B01D 53/263 | 62/101 |
| 5,131,238 A * | 7/1992 | Meckler | F02G 1/043 | 62/271 |
| 5,237,839 A * | 8/1993 | Dehne | F25B 15/04 | 62/476 |
| 5,259,202 A * | 11/1993 | Nishiguchi | F25B 15/008 | 62/147 |
| 5,592,825 A * | 1/1997 | Inoue | F25B 15/008 | 62/141 |
| 5,600,967 A * | 2/1997 | Meckler | F25B 15/008 | 62/476 |
| 5,761,925 A * | 6/1998 | Maeda | F24F 3/1411 | 62/476 |
| 5,941,089 A * | 8/1999 | Takaishi | F25B 15/02 | 62/324.2 |
| 6,050,083 A * | 4/2000 | Meckler | F01K 23/10 | 60/39.181 |
| 6,176,096 B1* | 1/2001 | Yuri | F25B 15/02 | 62/141 |
| 6,354,095 B1* | 3/2002 | Hwang | F25B 49/043 | 62/141 |
| 6,463,750 B2* | 10/2002 | Assaf | F24F 3/1417 | 62/271 |
| 6,523,357 B1* | 2/2003 | Katayama | F25B 15/06 | 62/141 |
| 6,606,881 B1* | 8/2003 | Justin | F25B 15/06 | 62/475 |
| 7,165,412 B1* | 1/2007 | Bean, Jr. | F25B 25/005 | 165/80.4 |
| 8,490,427 B2* | 7/2013 | Erickson | F24F 3/1417 | 62/271 |
| 9,488,394 B1* | 11/2016 | El-Shaarawi | F25B 27/007 | |
| 2001/0020367 A1* | 9/2001 | Funaba | F23M 9/10 | 62/238.3 |
| 2002/0108390 A1* | 8/2002 | Ichikawa | F25B 15/02 | 62/324.2 |
| 2002/0112503 A1* | 8/2002 | Yamazaki | F25B 15/008 | 62/476 |
| 2003/0010049 A1* | 1/2003 | Inoue | F25B 15/008 | 62/238.3 |

(56) References Cited

U.S. PATENT DOCUMENTS

| | | | | |
|---|---|---|---|---|
| 2003/0079494 A1* | 5/2003 | Yamazaki | ............... | F25B 15/06 62/476 |
| 2005/0016204 A1* | 1/2005 | Zhang | ................... | F25B 15/008 62/476 |
| 2005/0022963 A1* | 2/2005 | Garrabrant | ............. | F25B 15/04 165/58 |
| 2005/0193758 A1* | 9/2005 | Wells | ....................... | F25B 15/02 62/324.2 |
| 2006/0230776 A1* | 10/2006 | Inoue | ................... | F25B 15/008 62/324.2 |
| 2010/0064699 A1* | 3/2010 | Llurens | ................. | F24F 5/0046 62/79 |
| 2010/0242517 A1* | 9/2010 | Johnson | ................ | F24F 5/0035 62/259.4 |
| 2010/0270005 A1* | 10/2010 | Radhakrishnan | ..... | F25B 15/008 165/62 |
| 2011/0005253 A1* | 1/2011 | Kayanuma | ................ | F24D 3/08 62/238.3 |
| 2016/0123610 A1* | 5/2016 | Uselton | ................. | F24F 3/1417 62/94 |

FOREIGN PATENT DOCUMENTS

| | | | |
|---|---|---|---|
| CN | 105352079 | A | 2/2016 |
| JP | 2000171058 | A | 6/2000 |
| JP | 2004245546 | A | 9/2004 |

* cited by examiner

INDEPENDENT TEMPERATURE AND HUMIDITY PROCESSING AIR CONDITIONING SYSTEM DRIVEN BY LOW-LEVEL THERMAL ENERGY

CROSS REFERENCE TO RELATED APPLICATIONS

This application is a National Stage Application of International Application Number PCT/CN2016/083316, filed May 25, 2016; which claims priority to Chinese Application No. 201510820755.0, filed Nov. 24, 2015; both of which are incorporated herein by reference in their entirety.

FIELD OF THE INVENTION

The present invention relates to air-conditioning equipment, in particular to a low-grade heat driven temperature and humidity separately processed air-conditioning system.

BACKGROUND OF THE INVENTION

For conventional all-air-conditioning systems, the indoor load in the air conditioned area is fully borne by the heated or cooled air. To bear the indoor load, most conventional schemes employ condensation dehumidification way to process the air; however, the temperature of cold source required for cooling is actually apparently higher than the temperature of cold source required for dehumidification. Hence, it is difficult to meet the requirement for simultaneous change of indoor air temperature and humidity in the building by such an approach. In addition, since the fresh air handling unit in the system usually employs cooling coil pipes for dehumidification, the surfaces of the coil pipes always carry water. During the off-time of the system (at night or on non-working days), the surface temperature of the coil pipes increases, and the coil pipe surfaces contact with the air, providing nutritional conditions for reproduction of microorganisms and contaminating the fresh air.

Conventional single stage single-effect lithium bromide absorption refrigeration systems have favorable performance for air conditioning, and the temperature range of the low-grade heat source required for such a system is 90~120° C. If the temperature is lower than the lowest generation temperature, the conventional single-effect absorption refrigeration system cannot operate normally, i.e., the conventional single-effect absorption refrigeration circulation cannot utilize a heat source at a lower temperature to produce the cooling capacity at the required temperature. However, high-temperature and high-concentration lithium bromide solution may cause severe corrosion against common metal materials for absorption refrigeration systems, such as copper and carbon steel, etc. Consequently, efficient utilization of low-grade heat sources at 80° C. or lower temperatures by the $H_2O$—$LiBr$ working medium pair is limited.

A lithium bromide absorption refrigeration system is a refrigeration system that utilizes low-grade heat energy (residual heat, waste heat, etc.) as the driving power. Such a system saves electric power remarkably compared with a vapor compression refrigerator. If the temperature of the heat source can be decreased effectively, a wider range of heat sources will be provided for absorption refrigeration. To utilize heat at a lower temperature to produce the cooling capacity at a required refrigeration temperature, a two-stage absorption refrigeration system has been put forth. The working circulation of a two-stage absorption refrigeration system can produce cooling capacity at a lower temperature than the single-effect circulation, but the performance coefficient of such a working circulation is approximately half of the performance coefficient of the conventional single-effect circulation. Hence, it is an urgent task to decrease the temperature of the heat source for the system while maintaining a high performance coefficient of the system.

A conventional lithium bromide absorption refrigeration system can produce an evaporation temperature and cooling capacity of about 5° C., owing to the physical properties of lithium bromide. Lithium chloride cannot meet the requirement. However, the result of preliminary research has indicated that an absorption working medium pair composed of $LiCl$—$H_2O$ has higher thermodynamic performance. In the present invention, the temperature of the cold source is increased by changing the air conditioning mode, so that an absorption refrigeration circulation that utilizes $LiCl$—$H_2O$ as a working medium pair can be used for air conditioning, and thereby low-grade heat energy can be utilized efficiently, and the overall energy efficiency of the air conditioning system can be improved.

Liquid dehumidification-regeneration circulation systems have been widely applied in a variety of systems, owing to their advantages, such as low temperature of driving heat source, simple system structure, high energy storage density, and easy implementation, etc. In a liquid dehumidification-regeneration circulation system, the core components, including dehumidifier and regenerator, often exchange heat with air in a packed tower, and can bear the latent heat load in the system. Hence, the system is an energy-saving and environment-friendly circulation system.

It is seen from the above analysis: the two techniques are well complementary to each other. Therefore, it is of far reaching importance to make research on low-grade heat driven temperature and humidity separately processed air conditioning methods and systems.

I CONTENTS OF THE INVENTION

Technical Problem

The technical problem to be solved in the present invention is: providing a low-grade heat driven temperature and humidity separately processed air-conditioning system, to solve the problems of using efficiently driving absorption refrigeration for air conditioning at 80° C. or a lower temperature.

Technical Scheme

To attain the object described above, in embodiments of the present invention, the following technical scheme is employed: A low-grade heat driven temperature and humidity separately processed air-conditioning system, comprising an absorption refrigeration circulation loop, a solution dehumidification-regeneration circulation loop, a cooling water circulation loop, and central air conditioning air supply and return pipelines, wherein, the absorption refrigeration circulation loop comprises an evaporator, an absorber, a generation pump, a second solution heat exchanger, a generator, a condenser, a water-water heat exchanger, and a throttle valve, wherein, an upper output end of the generator is connected to an upper input end of the condenser, a lower output end of the condenser is connected to an upper left input end of the water-water heat exchanger, a lower left output end of the water-water heat exchanger is connected to an upper right input end of the evaporator via the throttle valve, an upper left output end of the evaporator is connected to an upper input end of the absorber, a lower output end of the absorber is connected to a lower left input end of the second solution heat exchanger via the generation pump, an upper left output end of the second solution heat exchanger is connected to a left input end of the generator, and a lower output end of the generator is connected to a left input end of the absorber via the second solution heat exchanger; the solution dehumidification-regeneration circulation loop comprises a regenerator, a first solution pump, a solution heater, a first solution heat exchanger, a second solution pump, a solution cooler, and a dehumidifier, wherein, a lower output end of the regenerator is connected to a right input end of the first solution heat exchanger via the first solution pump, a left output end of the first solution heat exchanger is connected to a lower right input end of the solution cooler; a lower left output end of the solution cooler is connected to an upper right input end of the dehumidifier, a lower output end of the dehumidifier is connected to a left input end of the first solution heat exchanger via the second solution pump, a right output end of the first solution heat exchanger is connected to a lower right input end of the solution heater, and a lower left output end of the solution heater is connected to an upper right input end of the regenerator, the cooling water circulation loop comprises two branches, wherein, a first branch comprises a cooling tower, a first valve, an absorber, and a condenser, wherein, a lower output end of the cooling tower is connected to a lower right input end of the absorber via the first valve, and an upper right output end of the absorber is connected to a lower right input end of the condenser; a second branch comprises a cooling tower, a second valve, a solution cooler, and a water-water heat exchanger, wherein, a lower output end of the cooling tower is connected to an upper right input end of the solution cooler via the second valve, an upper right output end of the solution cooler is connected to a lower right input end of the water-water heat exchanger via a water pump, an upper right output end of the water-water heat exchanger is merged with an upper right output end of the condenser through a pipeline and then connected to an upper left input end of the cooling tower; the central air conditioning air supply and return pipelines comprise: an air supply pipeline, an air return pipeline, an air heat exchanger, a dehumidifier, an evaporator, a supplied air induction port, a return air induction port, a second guide fan, and a regenerator, wherein, the air supply pipeline is connected to an upper right input end of the air heat exchanger, an upper right output end of the air heat exchanger is connected with a right input end of the dehumidifier through the air supply pipeline, a left output end of the dehumidifier is connected to a right input end of the evaporator through the air supply pipeline, a left output end of the evaporator is connected to an input end of the supplied air induction port through the air supply pipeline, and an output end of the supplied air induction port is connected to an air conditioned area; an input end at one side of the return air induction port extracts air from the air conditioned area, an output end at the other side of the return air induction port is connected to the air return pipeline, the air return pipeline is connected to a lower left input end of the air heat exchanger, a lower left output end of the air heat exchanger is connected to an input end of the second guide fan through the air return pipeline, and an output end of the second guide fan is connected to a lower right input end of the regenerator.

As a preferred embodiment, the cooling tower in the first branch of the cooling water circulation loop and the cooling tower in the second branch of the cooling water circulation loop are the same device; the condenser in the first branch and the condenser in the absorption refrigeration circulation loop are the same device; the absorber in the first branch and the absorber in the absorption refrigeration circulation loop are the same device; the solution cooler in the second branch and the solution cooler in the solution dehumidification-regeneration circulation loop are the same device; the water-water heat exchanger in the second branch and the water-water heat exchanger in the absorption refrigeration circulation loop are the same device.

As a preferred embodiment, the dehumidifier in the central air conditioning air supply and return pipelines and the dehumidifier in the solution dehumidification-regeneration circulation loop are the same component; the evaporator in the central air conditioning air supply and return pipelines and the evaporator in the absorption refrigeration circulation loop are the same component; the regenerator in the central air conditioning air supply and return pipelines and the regenerator in the solution dehumidification-regeneration circulation loop are the same component.

As a preferred embodiment, the generator in the absorption refrigeration circulation loop is driven by low-grade heat energy at 80□ or a lower temperature; the working evaporation temperature of the evaporator is 12~18□; the low-grade heat source for heating the solution entering into the regenerator in the solution dehumidification-regeneration circulation loop and the low-grade heat source in the absorption refrigeration circulation loop have the same source.

Beneficial Effects

Compared with the prior art, the embodiments of the present invention have the following beneficial effects:
(1) When a conventional absorption refrigeration system is used for air conditioning, the temperature of the heat source must be higher than 90° C. Therefore, an absorption refrigeration system cannot utilize heat energy at 80° C. or a lower temperature for air conditioning. A conventional absorption refrigeration system requires 7° C. chilled water for air conditioning, so as to accomplish air dehumidification and cooling, so as to reach the specified air supply condition point. The driving heat source must achieve 90° C. or a higher temperature, but a conventional vacuum tube heat collector or plate-type heat collector cannot provide hot water at such a temperature. The low-grade heat driven temperature and humidity separately processed air-conditioning system in this embodiment effectively solve the problem of how to utilize low grade heat energy at 80° C. or a lower temperature to drive absorption refrigeration for air conditioning. The present invention utilizes a temperature and humidity processing control method, wherein, the air humidity is regulated by virtue of a circulation of liquid desiccant, realizing processing of air humidity, and then the air is cooled in dry state with a high-temperature cold source. Since the temperature required for supplied air of air conditioning is usually 18-20° C., the chilled water produced by the absorption refrigeration system only has to be at 15° C. or a higher temperature. Driving heat source at 80° C. or a lower temperature can utilize the hot water produced by a conventional vacuum tube heat collector or plate-type heat collector as a feasible technical approach for conventional heat collector driven air-conditioning systems.
(2) The conventional techniques in the prior art cannot utilize LiCl—H$_2$O solution as an absorption working medium pair, because LiCl—H$_2$O solution cannot be used to produce 7° C. chilled water owing to the limitations of its physical properties. In this embodiment, LiCl—H$_2$O solution is utilized as an absorption working medium pair. LiCl—H$_2$O solution has higher energy efficiency than the conventional lithium bromide absorption system, because the heat and mass transfer performance of LiCl—H$_2$O solution is superior to that of the conventional absorption working medium pair.

(3) In this embodiment, absorption refrigeration is utilized in a temperature and humidity separately controlled air-conditioning system; thus, the temperature of the low-grade driving heat energy can be decreased remarkably to 80° C. or a lower temperature, and the system can be seamlessly connected with a conventional vacuum tube heat collector and plate-type heat collector (the existing absorption refrigeration air-conditioning systems cannot utilize such a heat collector as a driving heat source), and thereby the problem of simultaneous cooling and dehumidification in air conditioning can be solved by virtue of low-grade heat energy at 80☐ or a lower temperature. In addition, after the chilled water temperature is increased, LiCl—H$_2$O solution, which has higher energy efficiency, can be utilized as a working medium pair to produce chilled water at 15° C. or a higher temperature; in contrast, conventional absorption refrigeration can only utilize LiBr—H$_2$O working medium pair to produce 7° C. chilled water required for conventional air conditioning.

DESCRIPTION OF THE DRAWINGS

FIG. 1 is a schematic structural diagram of an embodiment of the present invention. In the FIGURE: 1—generator; 2—condenser; 3—water-water heat exchanger; 4—first guide fan; 5—cooling tower, 6—first valve; 7—second valve; 8—regenerator; 9—first solution pump; 10—solution heater; 11—second guide fan; 12—first solution heat exchanger; 13—air supply pipeline; 14—air return pipeline; 15—air heat exchanger, 16—second solution pump; 17—solution cooler; 18—dehumidifier; 19—water pump; 20—throttle valve; 21—evaporator; 22—return air induction port; 23—supplied air induction port; 24—air conditioned area; 25—generation pump; 26—absorber; 27—second solution heat exchanger.

DETAILED DESCRIPTION OF THE EMBODIMENTS

Hereunder the present invention will be further detailed in some embodiments with reference to the accompanying drawings. It should be appreciated that those embodiments are only provided here to describe the present invention instead of limiting the scope of the present invention. Based on the teachings in the present invention, those skilled in the art can make various modifications and variations to obtain different equivalents from the present invention, but all such modifications and variations shall be deemed as falling into the scope of the present invention as defined by the attached claims.

The embodiments of the present invention disclose a low-grade heat driven temperature and humidity separately processed air-conditioning system, mainly comprising an absorption refrigeration circulation loop, a solution dehumidification-regeneration circulation loop, a cooling water circulation loop, and central air conditioning air supply and return pipelines. The system processes supplied air temperature and humidity separately, i.e.: the solution dehumidification-regeneration circulation loop bears the latent heat load of fresh air and indoor air, while the absorption refrigeration circulation loop bears the sensible heat load of fresh air and indoor air; thus, the temperature of the low-grade heat source required for the generator is decreased, the technical problems in utilizing low-grade heat energy at 80° C. or a lower temperature to drive absorption refrigeration for air conditioning are solved effectively, and the air conditioning terminal units always operate in a dry state; hence, the indoor air quality is ensured, and the overall energy efficiency of the air conditioning system is improved. The system employs an absorption refrigeration working medium pair that has higher thermodynamic performance preferentially, such as LiCl—H$_2$O, etc.

Figure 1:
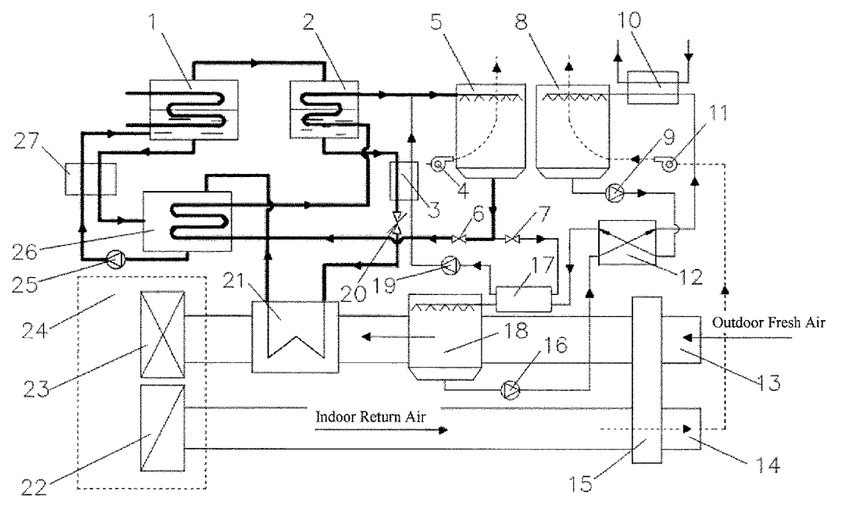

As shown in FIG. 1, the low-grade heat driven temperature and humidity separately processed air-conditioning system in an embodiment of the present invention comprises an absorption refrigeration circulation loop, a solution dehumidification-regeneration circulation loop, a cooling water circulation loop, and central air conditioning air supply and return pipelines, wherein, the absorption refrigeration circulation loop comprises an evaporator 21, an absorber 26, a generation pump 25, a second solution heat exchanger 27, a generator 1, a condenser 2, a water-water heat exchanger 3, and a throttle valve 20, wherein, an upper output end of the generator 1 is connected to an upper input end of the condenser 2, a lower output end of the condenser 2 is connected to an upper left input end of the water-water heat exchanger 3, a lower left output end of the water-water heat exchanger 3 is connected to an upper right input end of the evaporator 21 via the throttle valve 20, an upper left output end of the evaporator 21 is connected to an upper input end of the absorber 26, a lower output end of the absorber 26 is connected to a lower left input end of the second solution heat exchanger 27 via the generation pump 25, an upper left output end of the second solution heat exchanger 27 is connected to a left input end of the generator 1, and a lower output end of the generator 1 is connected to a left input end of the absorber 26 via the second solution heat exchanger 27;

the solution dehumidification-regeneration circulation loop comprises a regenerator 8, a first solution pump 9, a solution heater 10, a first solution heat exchanger 12, a second solution pump 16, a solution cooler 17, and a dehumidifier 18, wherein, a lower output end of the regenerator 8 is connected to a right input end of the first solution heat exchanger 12 via the first solution pump 9, a left output end of the first solution heat exchanger 12 is connected to a lower right input end of the solution cooler 17; a lower left output end of the solution cooler 17 is connected to an upper right input end of the dehumidifier 18, a lower output end of the dehumidifier 18 is connected to a left input end of the first solution heat exchanger 12 via the second solution pump 16, a right output end of the first solution heat exchanger 12 is connected to a lower right input end of the solution heater 10, and a lower left output end of the solution heater 10 is connected to an upper right input end of the regenerator 8;

the cooling water circulation loop comprises two branches, wherein, a first branch comprises a cooling tower 5, a first valve 6, an absorber 26, and a condenser 2, wherein, a lower output end of the cooling tower 5 is connected to a lower right input end of the absorber 26 via the first valve 6, and an upper right output end of the absorber 26 is connected to a lower right input end of the condenser 2; a second branch comprises a cooling tower 5, a second valve 7, a solution cooler 17, and a water-water heat exchanger 3, wherein, a lower output end of the cooling tower 5 is connected to an upper right input end of the solution cooler 17 via the second valve 7, an upper right output end of the solution cooler 17 is connected to a lower right input end of the water-water heat exchanger 3 via the water pump 19, an upper right output end of the water-water heat exchanger 3 is merged with an upper right output end of the condenser 2 through a pipeline and then connected to an upper left input end of the cooling tower 5; the central air conditioning air supply and return pipelines comprise: an air supply pipeline 13, an air return pipeline 14, an air heat exchanger 15, a dehumidifier 18, an evaporator 21, a supplied air induction port 23, a return air induction port 22, a second guide fan 11, and a regenerator 8, wherein, the air supply pipeline 13 is connected to an upper right input end of the air heat exchanger 15, an upper right output end of the air heat exchanger 15 is connected with a right input end of the dehumidifier 18 through the air supply pipeline 13, a left output end of the dehumidifier 18 is connected to a right input end of the evaporator 21 through the air supply pipeline 13, a left output end of the evaporator 21 is connected to an input end of the supplied air induction port 23 through the air supply pipeline 13, and an output end of the supplied air induction port 23 is connected to an air conditioned area 24; an input end at one side of the return air induction port 22 extracts air from the air conditioned area 24, an output end at the other side of the return air induction port 22 is connected to the air return pipeline 14, the air return pipeline 14 is connected to a lower left input end of the air heat exchanger 15, a lower left output end of the air heat exchanger 15 is connected to an input end of the second guide fan 11 through the air return pipeline 14, and an output end of the second guide fan 11 is connected to a lower right input end of the regenerator 8.

In the embodiment described above, preferably, the cooling tower 5 in the first branch of the cooling water circulation loop and the cooling tower 5 in the second branch of the cooling water circulation loop are the same device; the condenser 2 in the first branch and the condenser 2 in the absorption refrigeration circulation loop are the same device; the absorber 26 in the first branch and the absorber 26 in the absorption refrigeration circulation loop are the same device; the solution cooler 17 in the second branch and the solution cooler 17 in the solution dehumidification-regeneration circulation loop are the same device; the water-water heat exchanger 3 in the second branch and the water-water heat exchanger 3 in the absorption refrigeration circulation loop are the same device.

In the embodiment described above, preferably, the dehumidifier 18 in the central air conditioning air supply and return pipelines and the dehumidifier 18 in the solution dehumidification-regeneration circulation loop are the same component; the evaporator 21 in the central air conditioning air supply and return pipelines and the evaporator 21 in the absorption refrigeration circulation loop are the same component; the regenerator 8 in the central air conditioning air supply and return pipelines and the regenerator 8 in the solution dehumidification-regeneration circulation loop are the same component.

In the embodiment described above, preferably, the generator 1 in the absorption refrigeration circulation loop is driven by low-grade heat energy at 80° C. or a lower temperature; the evaporation operation temperature of the evaporator 21 is 12~18° C.; the low-grade heat source for heating the solution entering into the regenerator 8 in the solution dehumidification-regeneration circulation loop and the low-grade heat source in the absorption refrigeration circulation loop are the same source.

The working process of the low-grade heat driven temperature and humidity separately processed air-conditioning system in the above embodiment comprises a working process of the absorption refrigeration circulation loop, a working process of the solution dehumidification-regeneration circulation loop, a working process of cooling water circulation, and a working process of air supply and return processing.

The working process of the absorption refrigeration circulation loop is: after the evaporator 21 absorbs heat from the air supplied in the air supply pipeline 13, the refrigerant water is evaporated and turns into refrigerant vapor, the refrigerant vapor enters into the absorber 26, the concentrated LiCl solution in the absorber 26 absorbs the refrigerant vapor and turns into diluted LiCl solution; the diluted LiCl solution is pumped by the generation pump 25 into the second solution heat exchanger 27, exchanges sensible heat with the concentrated LiCl solution produced in generator 1, and then enters into the generator 1. Assisted by an external heat source, the water in the diluted LiCl solution is evaporated, the vapor produced in the evaporation flows into the condenser 2, is cooled by the cooling water supplied from the cooling tower 5, and thereby turns into refrigerant water; the refrigerant water flows out from the condenser 2, is throttled by the throttle valve 20, and then flows into the evaporator 21 under reduced pressure, absorbs heat from the supplied air in the evaporator 21 and is evaporated into refrigerant vapor; at the same time, the diluted LiCl solution that has lost vapor in the generator 1 turns into concentrated LiCl solution, the concentrated LiCl solution exchanges heat with the diluted LiCl solution in the second solution heat exchanger 27, and then enters into the absorber 26 and absorbs the refrigerant vapor; thus, an absorption refrigeration circulation loop is completed.

The working process of the solution dehumidification-regeneration circulation loop is as follows: the desiccant solution in the dehumidifier 18 flows across the supplied air to accomplish dehumidification, so that the concentration of the desiccant solution is decreased; then, the desiccant solution is pumped by the second solution pump 16 into the first solution heat exchanger 12, exchanges sensible heat with the high-temperature concentrated solution flowing out from the regenerator 8, and then enters into the solution heater 10 after finishing heat exchange, is heated by the same heat source for the generator 1, enters into the regenerator 8, is regenerated by the regeneration air flowing out from the air return pipeline 14 in a counter-flow manner; after the regeneration, the desiccant solution turns into concentrated solution, the concentrated solution is pumped by the first solution pump 9 into the first solution heat exchanger 12 and then into the solution cooler 17, the concentrated solution is cooled in the solution cooler 17, and then enters into the dehumidifier 18 and participates in the dehumidification process; thus, a solution dehumidification-regeneration circulation loop is completed.

The working process of cooling water circulation is divided into two parts: the cooling water produced in the cooling tower 5 is split into two branches under the action of the first valve 6 and the second valve 7, wherein, the cooling water in the first branch flows into the absorber 26 via the first valve 6, cools the absorber 26, and then flows into the condenser 2 and makes the vapor condensed, the condensed cooling water merges with the cooling water flowing out from the water-water heat exchanger 3 and flows into the cooling tower 5 together; thus, the first cooling water circulation branch is formed; the cooling water in the second branch flows into the solution cooler 17 via the second valve 7, super-cools the concentrated solution in the solution cooler 17, then exchanges sensible heat with the refrigerant water (i.e., the water used as the refrigeration working medium in the absorption refrigeration circulation) in the water-water heat exchanger 3, and finally merges with the cooling water flowing out from the condenser 2 and flows into the cooling tower 5 together; thus, the second cooling water circulation branch is completed.

The working process of air supply and return processing is as follows: the outdoor fresh air flows through the air supply pipeline 13, is cooled in the air/air heat exchanger 15, dehumidified in the dehumidifier 18, and further cooled in the evaporator 21, and then is sent to the air conditioned area 24. The fresh air absorbs indoor heat and moisture in the air conditioned area 24 and turns into high-temperature and high-humidity air, and then flows out through the air return pipeline 14. The return air flows through the air/air heat exchanger 15, in which the heat in the return air is recovered; then, the return air is guided by the second guide fan 11 into the regenerator 8, and is used as regeneration air to participate in the regeneration process; finally, the return air is exhausted into the outdoor environment; thus, the air supply and return processing process is accomplished.

The system in this embodiment processes the supplied air temperature and humidity separately, i.e.: utilize the solution dehumidification loop to bear the latent heat load of fresh air and indoor air and decrease the humidity of the processed air, and utilize the absorption refrigeration circulation to bear the sensible heat load of fresh air and indoor air and decrease the temperature of the processed air, so as to provide a condition for decreasing the temperature of the heat source for the generator. When the temperature of the driving heat source is low, lithium chloride solution exhibits better thermodynamic performance than lithium bromide solution. Therefore, incorporating the structural advantage of the system with the performance advantage of the LiCl—H$_2$O working medium pair, the low-grade heat driven temperature and humidity separately processed air-conditioning system has outstanding performance.

The low-grade heat driven temperature and humidity separately processed air-conditioning system in the embodiment described above processes the supplied air temperature and humidity separately, so that the dehumidifying system bears the latent heat load of fresh air and indoor air, while the refrigeration system bears the sensible heat load of fresh air and indoor air; thus, the temperature of the low-grade heat source in the absorber is decreased, and the technical problems in utilizing low-grade heat energy at 80° C. or a lower temperature to drive absorption refrigeration for air conditioning are effectively solved. An absorption working medium pair composed of LiCl—H$_2$O has higher thermodynamic performance. Since the temperature and humidity are processed separately, the temperature of cold source required for the system is increased, so that the system can utilize an absorption refrigeration circulation that employs LiCl—H$_2$O as a working medium pair for air conditioning; thus, low grade heat energy is utilized efficiently, and the overall energy efficiency of the air conditioning system is improved. In addition, the cooling units in the air-conditioning system always operate in a dry state. Therefore, the indoor air quality is ensured.

The outdoor fresh air is processed in the dehumidifier 18 and the evaporator 21 sequentially for regulating the temperature and humidity before the outdoor fresh air is sent to the air conditioned area 24; the evaporator 21 bears the sensible heat load of fresh air and indoor air, while the dehumidifier 18 bears the latent heat load of indoor air and fresh air.

The low-grade heat driven temperature and humidity separately processed air-conditioning system in the embodiments of the present invention processes the supplied air temperature and humidity separately, so that the dehumidifying system bears the latent heat load of fresh air and indoor air, while the refrigeration system bears the sensible heat load of fresh air and indoor air; thus, the temperature of the low-grade heat source in the generator is decreased, and the technical problems in utilizing low-grade heat energy at 80° C. or a lower temperature to drive absorption refrigeration for air conditioning are effectively solved. Since the temperature and humidity are processed separately, the temperature of cold source required for the system is increased, so that the system can utilize an absorption refrigeration circulation that employs LiCl—H$_2$O as a working medium pair for air conditioning; thus, low grade heat energy is utilized efficiently, and the overall energy efficiency of the air conditioning system is improved. In addition, the air conditioning terminal units always operate in a dry state; therefore, the indoor air quality is ensured.

The present invention utilizes an absorption refrigeration circulation driven by low grade heat energy lower than 80° C. and a solution dehumidification regeneration technique to process the temperature and humidity of the supplied air in the central air conditioning system separately. The dehumidifier 18 bears the latent heat load of fresh air and indoor air, while the absorption refrigeration circulation bears the sensible heat load of fresh air and indoor air; the fresh air is pre-cooled in the air heat exchanger 15, and then flows into the dehumidifier 18 in the air supply pipeline 13; the dehumidifier 18 sprays desiccant solution vertically to dehumidify the fresh air in a crossed-flow manner, and the desiccant solution is diluted in the dehumidification process; then, the desiccant solution flows into the first solution heat exchanger 12 and the solution heater 10 and is preheated therein; next, the desiccant solution flows into the regenerator 8 and is regenerated by the return air flowing from the second blower fan 11 in counter-flow manner; after the regeneration, the diluted desiccant solution turns into concentrated solution again, and the return air is directly exhausted into the outdoor environment. At that point, the obtained concentrated desiccant solution flows into the first solution heat exchanger 12 and the solution cooler 17, and is pre-cooled therein; then, the concentrated desiccant solution flows into the dehumidifier 18 and participates in the dehumidification process again. Thus, a dehumidification-regeneration circulation is completed. When the dehumidified fresh air flows through the evaporator 21, the refrigerant water in the evaporator 21 absorbs the sensible heat in the fresh air and attains a refrigeration function while it is evaporated into refrigerant vapor; the refrigerant vapor is absorbed by the concentrated absorbent in the absorber 26, and the absorbent is diluted and then flows into the second solution heat exchanger 27 and is pre-heated therein; next, the absorbent enters into the generator 1 and is concentrated and evaporated into vapor with the assistance of an external low-temperature heat source; the vapor enters into the condenser 2 and exchanges heat with the cooling water and thereby is condensed into refrigerant water; the refrigerant water is throttled by the throttle valve 20 and then flows into the evaporator 21, and attains a refrigeration function while it is evaporated in the evaporator 21. Thus, the absorption refrigeration circulation is completed. The cooling water flowing out from the cooling tower 5 is split into two branches: one branch is used for the absorption process in the cooling absorber 26 and the vapor condensation process in the condenser 2, while the other branch is used for super-cooling of the concentrated desiccant solution and super-cooling in the absorption refrigeration circulation; after the two branches exchange heat, all cooling water is merged by means of tee joints and then flows into the cooling tower 5; thus, the cooling water circulation process is finished. After the fresh air is dehumidified and cooled, it is sent to the air conditioned area 24; after the heat exchange, the return air is pre-heated in the air heat exchanger 15 and is used as regeneration air to participate in the regeneration process in the regenerator 8; after the regeneration process is accomplished, the return air is directly exhausted into the outdoor environment.

Since a conventional absorption refrigeration air-conditioning system utilizes the chilled water produced in the absorption refrigeration system for both dehumidification and cooling, in order to meet the requirements of dehumidification, the chilled water temperature must be not lower than 7° C. Therefore, conventionally, the heat source for driving the absorption refrigeration circulation for air conditioning is at a temperature higher than 85° C., and usually only LiBr—$H_2O$ working medium can be used. Consequently, the thermodynamic performance coefficient of the system is not high. All existing air conditioning systems utilize chilled water for both dehumidification and cooling. Though it is only required that the supplied air temperature should be about 18° C. and the cold source should be at 18° C. or a lower temperature for cooling, the temperature of cold source/chilled water must be not lower than 7° C. owing to the dehumidification requirement. Consequently, 7° C. cold source/chilled water has to be used for both cooling and dehumidification. In contrast, in the embodiment of the present invention, since the temperature and the humidity are processed independently, the air dehumidification can be processed by means of the solution dehumidification circulation, and the temperature of the cold source/chilled water required for cooling can be increased to 12-18° C.

The air-conditioning system in the above embodiment can also solve the problem that a conventional absorption refrigeration system cannot utilize the hot water produced by an ordinary vacuum tube heat collector or plate-type heat collector as a driving heat source to driving refrigeration for air conditioning; in addition, the air-conditioning system realizes processing temperature and humidity independently from each other, and ensures accuracy control and regulation of temperature and humidity.

The invention claimed is:

1. A low-grade heat driven temperature and humidity separately processed air-conditioning system, comprising:
    an absorption refrigeration circulation loop that comprises; an evaporator that absorbs heat from air supplied in an air supply pipeline to turn a refrigerant water into refrigerant vapor,
    an absorber containing concentrated LiCl solution that receives the refrigerant vapor which forms a diluted LiCl solution,
    a generation pump that pumps the diluted LiCl solution from the absorber,
    a second solution heat exchanger that receives the diluted LiCl solution from the generation pump,
    a generator in which the diluted LiCl solution is heated to form water vapor and concentrated LiCl,
    a condenser that receives the water vapor from the generator and cools it to form a refrigerant water,
    a water-water heat exchanger that receives the refrigerant water,
    a throttle valve that receives the refrigerant water from the water-water heat exchanger where it is throttled into the evaporator,
    a solution dehumidification-regeneration circulation loop that comprises:
    a dehumidifier containing a desiccant solution through which a supplied air from an air supply pipeline passes to dehumidify the supplied air and dilute the desiccant solution;
    a second solution pump that pumps the diluted desiccant solution from the dehumidifier;
    a first solution heat exchanger that receives the diluted desiccant solution from the second solution pump;
    a solution heater that receives the diluted desiccant solution from the first solution heat exchanger, where it is heated;
    a regenerator that receives the diluted desiccant solution from the solution heater and air from the air return pipeline, whereby the diluted desiccant solution becomes concentrated by the air,
    a first solution pump that pumps the concentrated desiccant solution from the regenerator to the first solution heat exchanger, where sensible heat is exchanged with the diluted desiccant solution passing through the first solution pump,
    a solution cooler that receives and cools the concentrated desiccant solution from the first solution pump and passes the cooled concentrated desiccant solution to the dehumidifier, and
    a cooling water circulation loop comprising:
    a cooling tower that produces cool water,
    a first valve through which cool water enters a first branch and a second valve through which cool water enters a second branch,
    the first branch comprising an absorber that receives the cool water and passes the cool water to the condenser where the water vapor in the condenser condenses and merges with water in the water-water heat exchanger;
    the second branch comprising the solution cooler that receives cool water to cool the concentrated desiccant solution received from the regenerator:
    a water pump that pumps the cool water from the solution cooler to water-water exchanger to exchange sensible heat with the refrigerant water therein and then merges with the water from the condenser and flows back to the cooling tower; and
    a central air conditioning air supply and return pipelines comprising:
    the air supply pipeline that receives fresh air;
    an air heat exchanger through which fresh air passes and is cooled before passing through the dehumidifier and the evaporator through a supplied air induction port into an area to be air conditioned;
    an air return pipeline through which air is removed through a return air induction port from the area to be air conditioned, so that the returned air passes back through the air heat exchanger, and
    a second guide fan that directs the returned air, as it leaves the air heat exchanger, towards the regenerator, where the return air concentrates the LiCl solution in the regenerator.

2. The low-grade heat driven temperature and humidity separately processed air-conditioning system according to claim 1, wherein, the first branch of the cooling water circulation loop and the second branch of the cooling water circulation loop are operably connected to said cooling tower; the first branch and the absorption refrigeration circulation loop are operably connected to said condenser; the first branch and the absorption refrigeration circulation loop are operably connected to said absorber; the second branch and the solution dehumidification-regeneration circulation loop are operably connected to said solution cooler; the second branch and the absorption refrigeration circulation loop are operably connected to said water-water heat exchanger.

3. The low-grade heat driven temperature and humidity separately processed air-conditioning system according to claim 2, wherein, the central air conditioning air supply and return pipelines and the solution dehumidification-regeneration circulation loop are operably connected to said dehumidifier; the central air conditioning air supply and return pipelines and the absorption refrigeration circulation loop are operably connected to said evaporator; the central air conditioning air supply and return pipelines and the solution dehumidification-regeneration circulation loop are operably connected to said regenerator.

4. The low-grade heat driven temperature and humidity separately processed air-conditioning system according to claim 1, wherein, the generator in the absorption refrigeration circulation loop is driven by low-grade heat energy at 80° C. or a lower temperature; the working evaporation temperature of the evaporator ranges from 12° C. to 18° C.; the low-grade heat source for heating the solution entering into the regenerator in the solution dehumidification-regeneration circulation loop and the low-grade heat source in the absorption refrigeration circulation loop have the same source.

* * * * *